(12) United States Patent
Warashina

(10) Patent No.: US 11,752,885 B2
(45) Date of Patent: Sep. 12, 2023

(54) ELECTRIC VEHICLE POWER CONVERTER STRUCTURE

(71) Applicant: TOYOTA JIDOSHA KABUSHIKI KAISHA, Toyota (JP)

(72) Inventor: Taisuke Warashina, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 17/472,917

(22) Filed: Sep. 13, 2021

(65) Prior Publication Data

US 2022/0176835 A1 Jun. 9, 2022

(30) Foreign Application Priority Data

Dec. 9, 2020 (JP) ................................ 2020-204051

(51) Int. Cl.
*B60L 50/60* (2019.01)
*H01M 50/296* (2021.01)

(52) U.S. Cl.
CPC .......... *B60L 50/66* (2019.02); *H01M 50/296* (2021.01)

(58) Field of Classification Search
CPC ........ B60L 50/66; B60L 15/007; B60L 53/22; B60L 3/00; B60L 2210/00; H01M 50/296; B60R 16/02
See application file for complete search history.

(56) References Cited

U.S. PATENT DOCUMENTS

| 5,585,681 | A  | * | 12/1996 | Bitsche ................. | B60K 11/02 |
|---|---|---|---|---|---|
|  |  |  |  |  | 310/68 R |
| 6,198,183 | B1 | * | 3/2001 | Baeumel ................ | H02K 5/225 |
|  |  |  |  |  | 310/52 |
| 8,598,733 | B2 | * | 12/2013 | Ryu ....................... | H02K 11/33 |
|  |  |  |  |  | 307/9.1 |
| 10,479,221 | B2 | * | 11/2019 | Kamikihara ........... | B60L 50/66 |
| 10,483,018 | B1 | * | 11/2019 | Chiu ...................... | G01R 27/26 |
| 11,155,173 | B2 | * | 10/2021 | Kanzaki ................. | B60L 50/66 |
| 2003/0200761 | A1 | * | 10/2003 | Funahashi .......... | F04C 29/0085 |
|  |  |  |  |  | 62/228.4 |
| 2009/0024267 | A1 | * | 1/2009 | Kawai ................... | B60L 53/305 |
|  |  |  |  |  | 903/902 |
| 2009/0246047 | A1 |  | 10/2009 | Hattori et al. |  |

(Continued)

FOREIGN PATENT DOCUMENTS

CN 109818546 A 5/2019
CN 108202588 B 8/2020
(Continued)

*Primary Examiner* — Jason D Shanske
*Assistant Examiner* — James J Triggs
(74) *Attorney, Agent, or Firm* — Oliff PLC

(57) ABSTRACT

An electric vehicle includes an electrical power converter including a case that has electrical conductivity, a cable that connects the electrical power converter and a battery, a high voltage connector that is provided at an end portion of the cable, and that is detachably mountable to the electrical power converter, a resin cover that is fixed to the case, and that protects the cable, a bracket that is fixed to the case, and that fixes the electrical power converter to a vehicle body of the electric vehicle, a metal plate that conducts with the vehicle body via the case and the bracket, and that is fixed on the resin cover, and a ground line that links the high voltage connector and the metal plate.

8 Claims, 2 Drawing Sheets

(56) References Cited

U.S. PATENT DOCUMENTS

| | | | | |
|---|---|---|---|---|
| 2015/0333602 A1* | 11/2015 | Mohr | ................... | H02K 5/203 |
| | | | | 310/68 B |
| 2018/0175350 A1 | 6/2018 | Goitsuka et al. | | |
| 2019/0152331 A1* | 5/2019 | Sawazaki | .............. | H02M 7/003 |
| 2019/0319551 A1* | 10/2019 | Song | ................... | H02M 7/5387 |
| 2020/0361301 A1* | 11/2020 | Sakamoto | ........... | H01M 50/284 |
| 2022/0176835 A1* | 6/2022 | Warashina | ............ | B60L 3/0007 |
| 2022/0227244 A1* | 7/2022 | Niwa | ..................... | B60L 53/14 |

FOREIGN PATENT DOCUMENTS

| | | |
|---|---|---|
| JP | H08-321359 A | 12/1996 |
| JP | 2008-303811 A | 12/2008 |
| JP | 2009-247066 A | 10/2009 |
| JP | 2011-244580 A | 12/2011 |
| JP | 2015-220920 A | 12/2015 |
| JP | 2016-060262 A | 4/2016 |
| JP | 2018-111420 A | 7/2018 |
| JP | 2018-152942 A | 9/2018 |

* cited by examiner

ELECTRIC VEHICLE POWER CONVERTER STRUCTURE

CROSS-REFERENCE TO RELATED APPLICATION

This application claims priority to Japanese Patent Application No. 2020-204051 filed on Dec. 9, 2020, incorporated herein by reference in its entirety.

BACKGROUND

1. Technical Field

The present disclosure relates to an electric vehicle.

2. Description of Related Art

Technology in which an electromagnetic shielding member is interposed between a flange portion and a casing of a high frequency connector is disclosed in Japanese Unexamined Patent Application Publication No. 8-321359 (JP 8-321359 A), for example.

SUMMARY

There is demand for appropriately grounding from a high voltage connector to a vehicle body in an electric vehicle provided with an electrical power converter.

Accordingly, the present disclosure provides an electric vehicle in which grounding from a high voltage connector to a vehicle body is appropriately performed.

An electric vehicle according to an aspect of the present disclosure relates to an electrical power converter, a cable, a high voltage connector, a resin cover, a bracket, a metal plate, and a ground line. The electrical power converter includes a case that has electrical conductivity. The cable is configured to connect the electrical power converter and a battery. The high voltage connector is provided at an end portion of the cable, and is configured to be detachably mountable to the electrical power converter. The resin cover is fixed to the case, and is configured to protect the cable. The bracket is fixed to the case, and is configured to fix the electrical power converter to a vehicle body. The metal plate is fixed on the resin cover such that the metal plate conducts with the vehicle body via the case and the bracket. The ground line is configured to link the high voltage connector and the metal plate.

According to the electric vehicle of the above aspect, the ground line linked to the high voltage connector is linked to the metal plate that conducts with the vehicle body via the case and the bracket. Accordingly, grounding from the high voltage connector to the vehicle body is appropriately performed.

The electric vehicle of the above aspect may further include a fastening member configured to fix the metal plate to the resin cover. The metal plate may include a connecting portion connected to the resin cover by the fastening member. The resin cover may include a fastening portion configured to be fastened to the case. The fastening member may be configured to fix the connecting portion and the fastening portion to the case such that the metal plate conducts with the case.

According to the electric vehicle of the above configuration, the metal plate can be fixed to the resin cover without increasing the number of fastening points.

The electric vehicle of the above configuration may further include another fastening member fixing the metal plate to the resin cover. The metal plate may include another connecting portion connected to the resin cover by the other fastening member, and an intermediate portion located between the connecting portion and the other connecting portion. The resin cover may further include another fastening portion configured to be fastened to the case. The other fastening member may be configured to fix the other connecting portion and the other fastening portion to the case such that the metal plate conducts with the case. The ground line may be linked to the intermediate portion.

According to the electric vehicle of the above configuration, the ground line conducts with the case via the connecting portion of the metal plate and the other connecting portion. Accordingly, ground current flows from the high voltage connector to the vehicle body more appropriately.

In the electric vehicle of the above configuration, the resin cover may include a recessed portion provided between the fastening portion and the other fastening portion. The intermediate portion may have a shape that fits into the recessed portion.

According to the electric vehicle of the above configuration, the metal plate can be positioned as to the resin cover by the intermediate portion and the recessed portion.

The electric vehicle of the above configuration may further include a cover member that is made of rubber and is held by the resin cover and that covers a lower portion of the high voltage connector.

In the electric vehicle of the above configuration, a water discharge port may be provided to the intermediate portion.

The electric vehicle of the above aspect may further include an in-vehicle part that is disposed on an opposite side from a side at which the high voltage connector is disposed with respect to the metal plate as a reference.

According to the electric vehicle of the above configuration, even when external force is applied to the high voltage connector, in the direction of the high voltage connector coming into contact with the in-vehicle part, due to a collision or the like of the electric vehicle, collision of the in-vehicle part with the high voltage connector, and consequent damage of the high voltage connector, can be suppressed by the metal plate.

In the electric vehicle of the above configuration, a length of the metal plate in a width direction is greater than a length of the high voltage connector in the width direction.

According to the present disclosure, an electric vehicle can be provided in which grounding from the high voltage connector to the vehicle body can be appropriately performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
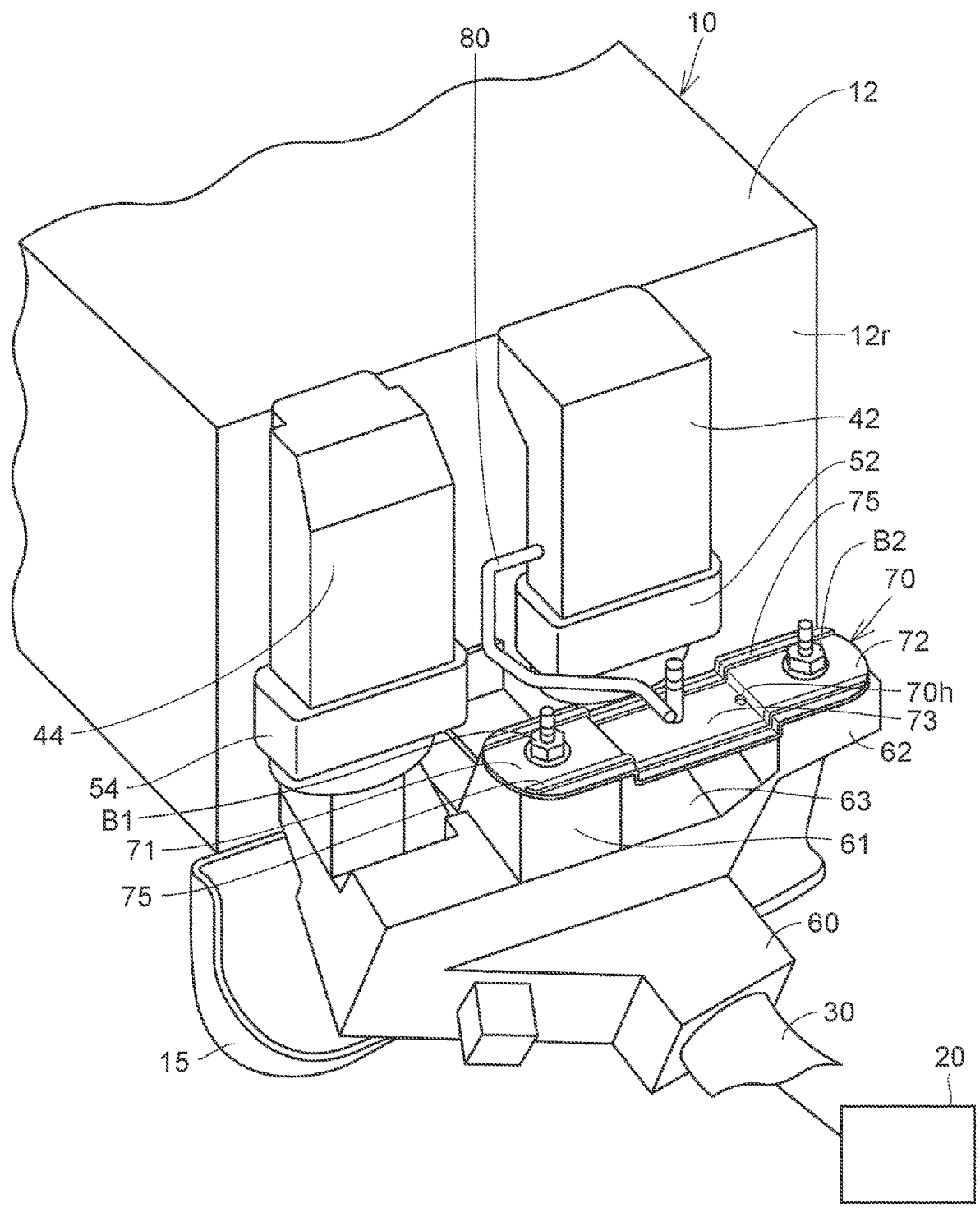
FIG. 1 is a perspective view schematically illustrating around an electrical power converter in an electric vehicle according to an embodiment that is an example of the present disclosure.

An embodiment of the present disclosure will be described with reference to the drawings. Note that in the drawings referenced below, members that are the same or equivalent are denoted by the same signs.

Figure 2:
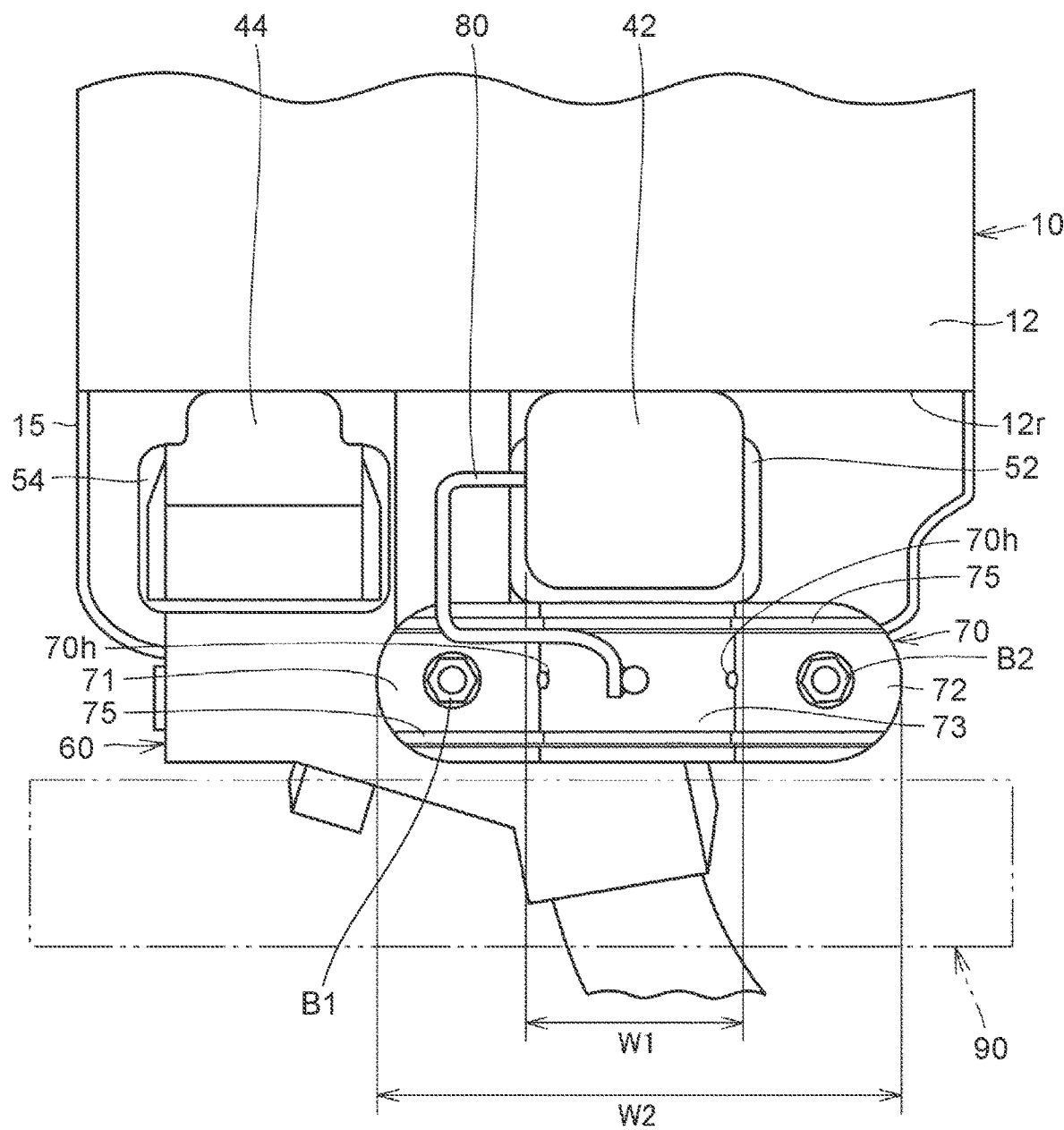
FIG. 2 is a planar view of the electrical power converter illustrated in FIG. 1.

FIG. 1 is a perspective view schematically illustrating around an electrical power converter in an electric vehicle according to an embodiment of the present disclosure. FIG. 2 is a planar view of the electrical power converter illustrated in FIG. 1.

The electric vehicle is provided with an electrical power converter 10, a bracket 15, a battery 20, a cable 30, a high voltage connector 42, a motor generator (MG) connector 44, a first cover member 52, a second cover member 54, a resin cover 60, a metal plate 70, a ground line 80, an in-vehicle part 90, a first fastening member B1, and a second fastening member B2, as illustrated in FIGS. 1 and 2. The first fastening member B1 and the second fastening member B2 here are examples of a "fastening member" or "another fastening member" of the disclosure.

The electrical power converter 10 includes a case 12 that has electrical conductivity. The case 12 is made of aluminum, for example. The case 12 includes a rear portion 12r. In the present embodiment, the electrical power converter 10 is installed forward from the vehicle cabin. The electrical power converter 10 is disposed to be oriented such that the rear portion 12r of the case 12 faces the vehicle cabin side.

The bracket 15 is fixed to the case 12. The bracket 15 is a member for fixing the electrical power converter 10 to the vehicle body. The bracket 15 is fixed to the rear portion 12r of the case 12 in the present embodiment.

The battery 20 is installed rearward from the electrical power converter 10 (e.g., below a rear seat).

The cable 30 connects the electrical power converter 10 and the battery 20.

The high voltage connector 42 is provided to one end portion of the cable 30. Note that the other end portion of the cable 30 is connected to the battery 20. The high voltage connector 42 is detachably mountable to the electrical power converter 10. An example of the high voltage connector 42 is a positive negative (PN) connector.

The MG connector 44 is provided to the one end portion of the cable 30. Specifically, the one end portion of the cable 30 branches into two, with the high voltage connector 42 being connected to one side and the MG connector 44 being connected to the other side. The MG connector 44 is detachably mountable to the electrical power converter 10. The MG connector 44 is detachably mountable to the rear portion 12r of the case 12, at a position away from the high voltage connector 42 in the vehicle width direction (the right-left direction in FIG. 2).

The first cover member 52 covers a lower portion of the high voltage connector 42. The first cover member 52 is made of rubber. The first cover member 52 here is an example of a "cover member" of the disclosure.

The second cover member 54 covers a lower portion of the MG connector 44. The second cover member 54 is made of rubber.

The resin cover 60 is made of resin and is fixed to the case 12. The resin cover 60 protects the cable 30. More specifically, the resin cover 60 protects the branched portion on the one end portion of the cable 30. The resin cover 60 holds the first cover member 52 and the second cover member 54 with the first cover member 52 and the second cover member 54 arrayed in the width direction. The resin cover 60 includes a first fastening portion 61 that is equivalent to a fastening portion, a second fastening portion 62, and a recessed portion 63. The first fastening portion 61 and the second fastening portion 62 here are examples of a "fastening portion" or "another fastening portion" according to the disclosure.

The first fastening portion 61 can be fastened to the case 12. The first fastening portion 61 is fixed to the case 12 by the first fastening member B1. The upper face of the first fastening portion 61 is formed in a flat shape.

The second fastening portion 62 can be fastened to the case 12. The second fastening portion 62 is formed at a position away from the first fastening portion 61 in the width direction. The second fastening portion 62 is fixed to the case 12 by the second fastening member B2. The upper face of the second fastening portion 62 is formed in a flat shape.

The recessed portion 63 is provided between the first fastening portion 61 and the second fastening portion 62. The recessed portion 63 has a shape that is recessed downward from the first fastening portion 61 and the second fastening portion 62.

The metal plate 70 is fixed upon the resin cover 60, so as to conduct with the vehicle body via the case 12 and the bracket 15. The metal plate 70 includes a first connecting portion 71, a second connecting portion 72, an intermediate portion 73, and bead portions 75. The first connecting portion 71 and the second connecting portion 72 here are examples of a "connecting portion" or "another connecting portion" of the disclosure.

The first connecting portion 71 is connected to the first fastening portion 61 of the resin cover 60 by the first fastening member B1. Accordingly, the metal plate 70 conducts with the vehicle body via the first fastening member B1, the case 12, and the bracket 15. In other words, the first fastening member B1 fixes the first connecting portion 71 and the first fastening portion 61 to the case 12 so that the metal plate 70 conducts with the case 12. The first connecting portion 71 is formed to have a flat shape.

The second connecting portion 72 is connected to the second fastening portion 62 of the resin cover 60 by the second fastening member B2. That is to say, the second fastening member B2 fixes the second connecting portion 72 and the second fastening portion 62 to the case 12 so that the metal plate 70 conducts with the case 12. The second connecting portion 72 is formed to have a flat shape. The second connecting portion 72 is formed at a position away from the first connecting portion 71 in the width direction.

The intermediate portion 73 is located between the first connecting portion 71 and the second connecting portion 72. The intermediate portion 73 is formed to have a flat shape. The intermediate portion 73 is located lower than the first connecting portion 71 and the second connecting portion 72. The distance (height) from the first connecting portion 71 and the second connecting portion 72 to the intermediate portion 73 preferably is set to be great, from the perspective of raising the degree of freedom of handling the first cover member 52. The intermediate portion 73 has a form that is fit into the recessed portion 63 of the resin cover 60. Water discharge ports 70h are provided to the intermediate portion 73. The water discharge ports 70h are provided on opposite ends of the intermediate portion 73 in the width direction in the present embodiment. A stud bolt is fixed to the intermediate portion 73.

The bead portions 75 have forms extending from one end of the metal plate 70 to the other end of the metal plate 70 in the width direction. In the present embodiment, the bead portions 75 are provided at two positions with the first fastening member B1 and the second fastening member B2 interposed therebetween in a direction orthogonal to the width direction (the up-down direction in FIG. 2).

A length W2 of the metal plate 70 in the width direction is greater than a length W1 of the high voltage connector 42 in the width direction, as illustrated in FIG. 2.

The ground line 80 links the high voltage connector 42 and the metal plate 70. In the present embodiment, the ground line 80 extends from the high voltage connector 42, and the tip thereof is connected to the intermediate portion 73 of the metal plate 70. Examples of methods of fixing the ground line 80 to the metal plate 70 include welding, swaging, and so forth.

The in-vehicle part 90 is disposed on the opposite side (lower side in FIG. 2) from the side at which the high voltage connector 42 is disposed with respect to the metal plate 70 as a reference. Examples of the in-vehicle part 90 include a dash panel and an air cleaner. Note that the in-vehicle part 90 is not illustrated in FIG. 1, and is indicated by long dashed double-short dashed lines in FIG. 2.

As described above, the ground line 80 linked to the high voltage connector 42 is connected to the metal plate 70 that conducts with the vehicle body, via the case 12 and the bracket 15, in the electric vehicle according to the present embodiment. Accordingly, grounding from the high voltage connector 42 to the vehicle body is performed appropriately.

Also, the metal plate 70 is connected to the resin cover 60, and accordingly the apparent rigidity of the resin cover 60 is improved.

Also, a separate ground line that links the MG connector 44 and the metal plate 70 may be provided in the above embodiment, although omitted from illustration. In this case, the metal plate 70 may be extended in the width direction.

The embodiment disclosed herein should be understood to be exemplary in all points, and not restrictive. The scope of the disclosure is not laid forth in the above-described embodiment but in the Claims, and is intended to include all equivalencies of the Claims and all modifications that may be made without departing from the scope thereof

What is claimed is:

1. An electric vehicle comprising:
   an electrical power converter including a case that has electrical conductivity;
   a cable that is configured to connect the electrical power converter and a battery to each other;
   a high voltage connector provided at an end portion of the cable, and configured to be detachably mounted to the electrical power converter;
   a resin cover fixed to the case and configured to protect the cable;
   a bracket fixed to the case and configured to fix the electrical power converter to a vehicle body of the electric vehicle;
   a metal plate fixed on the resin cover and electrically conductively connected to the case so that the metal plate conducts with the vehicle body via the case and the bracket; and
   a ground line that electrically interconnects the high voltage connector and the metal plate.

2. The electric vehicle according to claim 1, further comprising a first fastening member configured to fix the metal plate to the resin cover, wherein
   the metal plate includes a first connecting portion connected to the resin cover by the first fastening member,
   the resin cover includes a first fastening portion configured to be fastened to the case, and
   the first fastening member is configured to fix the first connecting portion and the first fastening portion to the case and the first fastening member electrically conductively connects the metal plate to the case.

3. The electric vehicle according to claim 2, further comprising a second fastening member fixing the metal plate to the resin cover, wherein
   the metal plate includes a second connecting portion connected to the resin cover by the second fastening member, and an intermediate portion located between the first connecting portion and the second connecting portion,
   the resin cover further includes a second fastening portion configured to be fastened to the case,
   the second fastening member is configured to fix the second connecting portion and the second fastening portion to the case and the second fastening member electrically conductively connects the metal plate to the case, and
   the ground line is electrically connected to the intermediate portion.

4. The electric vehicle according to claim 3, wherein:
   the resin cover includes a recessed portion provided between the first fastening portion and the second fastening portion; and
   the intermediate portion has a shape that fits into the recessed portion.

5. The electric vehicle according to claim 4, further comprising a cover member that is made of rubber, is held by the resin cover and covers a lower portion of the high voltage connector.

6. The electric vehicle according to claim 4, wherein the intermediate portion includes a water discharge port.

7. The electric vehicle according to claim 1, further comprising an in-vehicle part disposed on a first side of the metal plate, which is opposite from a second side of the metal plate at which the high voltage connector is disposed.

8. The electric vehicle according to claim 7, wherein a length of the metal plate in a width direction is greater than a length of the high voltage connector in the width direction.

* * * * *